July 11, 1972     R. ANDRUCHIW     3,675,997
METHOD OF ILLUMINATING PRESELECTED AREAS OF A DISPLAY
Filed April 6, 1970     4 Sheets-Sheet 1
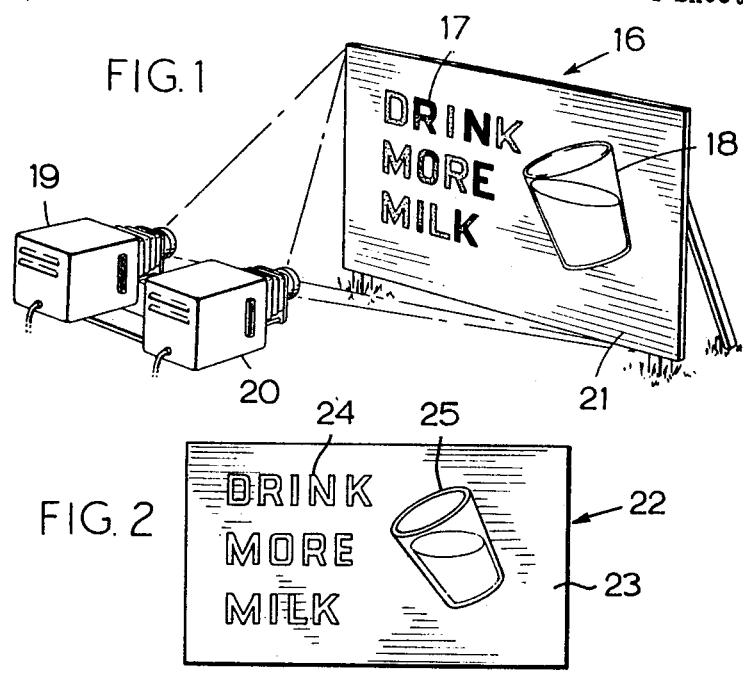
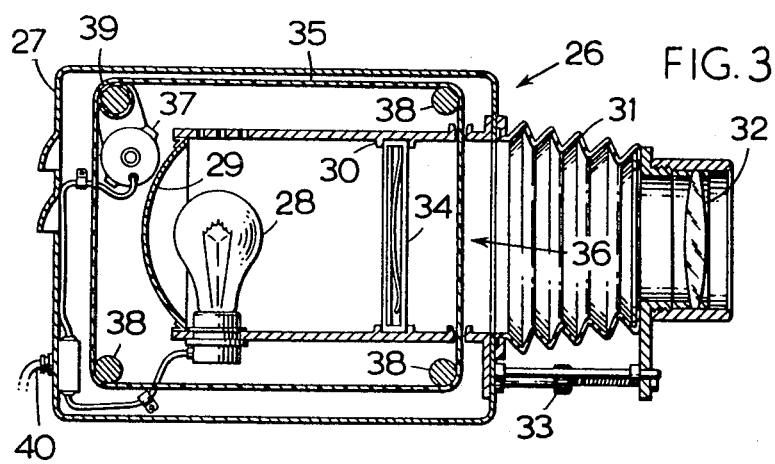
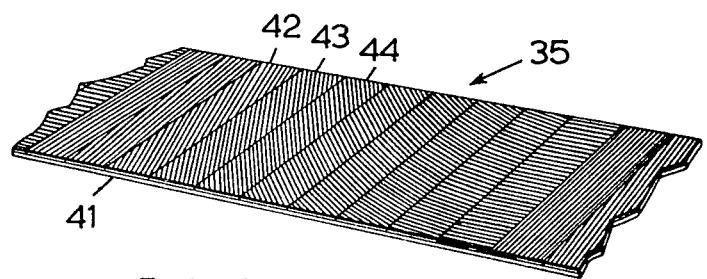
INVENTOR
ROMAN ANDRUCHIW
Agent

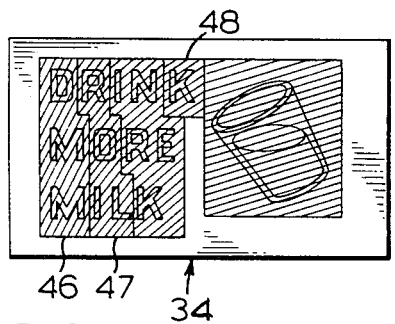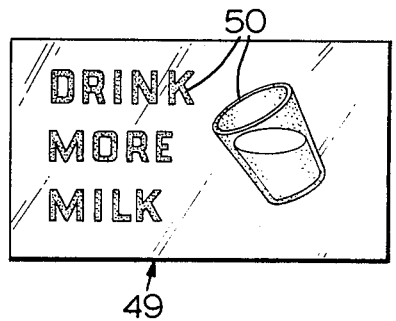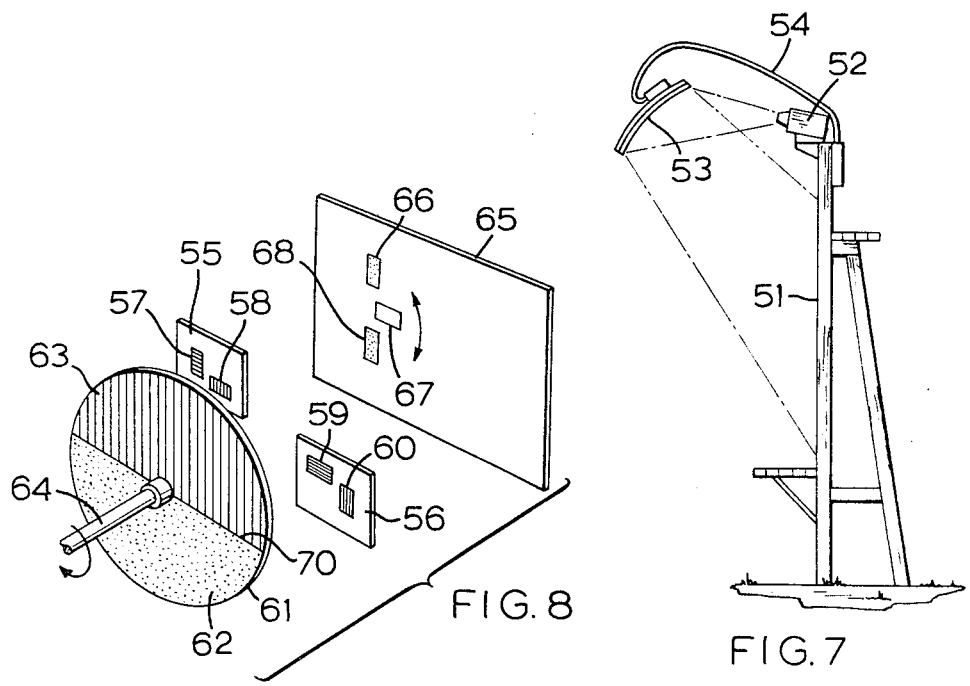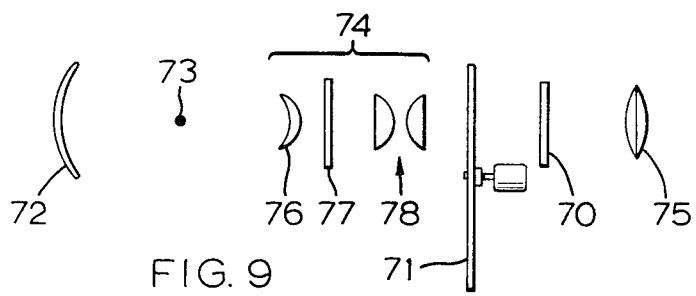

United States Patent Office 3,675,997
Patented July 11, 1972

3,675,997
METHOD OF ILLUMINATING PRESELECTED AREAS OF A DISPLAY
Roman Andruchiw, 137 Spring Garden Ave., Willowdale, Ontario, Canada
Continuation-in-part of application Ser. No. 717,663, Apr. 1, 1968. This application Apr. 6, 1970, Ser. No. 25,694
Int. Cl. G03b 21/00
U.S. Cl. 353—28                              2 Claims

ABSTRACT OF THE DISCLOSURE

Preselected areas of a billboard are illuminated by means of a transparency produced by photographing the billboard from a fixed station, producing from the negative a transparency which is opaque except for clear areas which correspond to the preselected areas on the billboard. The transparency is inserted into a projector and positioned at the fixed station. The lens used to focus the image onto the billboard is the same as the camera lens used to obtain the photograph and the aperture settings of the camera and projector are the same. The billboard may be animated by interposing light interfering means such as an interrupter or analyzer in the light path between the light source from the projector and the billboard. The apparatus for animating the billboard includes a bulb, a projection lens, a condensing lens system to direct light from the bulb through the projection lens, a guide for a transparency between the condensing lens and the projection lens and a disc mounted for rotation in the light path. Photographic film may be inserted into the guide and the film exposed through the projection lens. A shutter arrangement is provided to control the exposure time. A peep hole is provided for viewing the interior of the apparatus from the outside in order to properly focus the image from the billboard on the film.

---

This application is a continuation-in-part of application Ser. No. 717,663 filed Apr. 1, 1968, now abandoned.

This invention relates to visual displays and is particularly directed to a method and apparatus for providing illumination to advertising displays and to means by which the displays may be animated by means of the illumination method and apparatus.

In the advertising display field spotlights are commonly used to illuminate the display surfaces of signs and billboards. Preselected portions of the display surfaces cannot normally be illuminated by spotlights, the usual means employed for that purpose being lights mounted on the display surfaces. Animation of the sign or billboard is normally achieved by flashing lights or by the use of revolving panels. Where it is desired to illuminate preselected areas of a display surface for the purpose of high-lighting or animating these areas, a substantial investment is required and such illuminating means are normally only incorporated into displays which will remain unchanged over an extended period. Thus an advertiser of modest means or an advertiser who is constantly introducing new products cannot consider such a display.

In order to animate a sign or billboard by simple means, a motion picture projector has on occasions been employed for displaying a moving picture on a blank screen. Animation by this method is usually not satisfactory as a result of the poor definition of the image projected onto the display means. This is a particularly serious problem in daylight or when ambient light is bright. Another approach has been the use of a billboard composed of a number of panels of translucent material. Such material is, however, expensive and is not effective in bright light.

It is accordingly an object of the present invention to provide a method and apparatus for illuminating a conventional inanimate billboard by highlighting preselected portions of the display surface by an optical projection system.

It is a further object to provide a method and apparatus for obtaining a transparency which in conjunction with an optical projection system are adapted to illuminate preselected portions of a display.

The above objects relating to a method may be accomplished by a method of illuminating preselected areas on a display means having visible forms thereon including: locating at a fixed station photographic film within a camera; exposing said film to light through a first lens system to obtain a negative of said display means; obtaining from said negative a transparency which is opaque save for clear optically projectable forms corresponding to said preselected areas on said display means; locating said transparency at said fixed station; directing light from a light source through said transparency and a lens system identical to said first lens system onto said display means to produce an image on said display means in registry with said preselected areas, the aperture setting of said first lens system when said film is exposed to light being the same as the aperture setting of said identical lens system when used to produce said image.

The objects relating to an apparatus may be accomplished by an apparatus comprising: an apparatus for animating a display means comprising; a housing; a light source mounted within said housing; a first lens system adapted to focus light from said light source upon a display means; shutter means for admitting light from outside said housing for a pre-determined interval of time; a condensing lens system for directing light from a light source through said first lens system; a guide adapted to removably receive photographic film and a transparency, said guide being mounted between said first lens and said condensing lens system; and an interruptor mounted for rotation between said guide and said condensing lens system, said housing having an aperture formed within for viewing photographic film with said guide; and means for closing said aperture.

A fuller understanding of the invention may be had by referring to the following description and claims taken in conjunction with the accompanying drawings, in which:

FIG. 1 is a perspective view of display system according to the present invention;

FIG. 2 is a view of a transparency suitable for illuminating preselected forms on dsplay means;

FIG. 3 is a mid-vertical section through a projector suitable for use with the method of the present invention;

FIG. 4 is a fragmentary perspective view of a polarizing belt suitable for use with the projector shown in FIG. 3;

FIG. 5 is a view of a transparency suitable for producing animation effects with the present invention;

FIG. 6 is a view of a transparency suitable for providing an illuminated background for use with the present invention;

FIG. 7 is an end elevation of a mounting and projection system for use with the present invention;

FIG. 8 is a schematic perspective view of a further embodiment of the present invention;

FIG. 9 is a diagrammatic representation of a preferred embodiment of an arrangement of elements for animating a display means;

Figure 10:
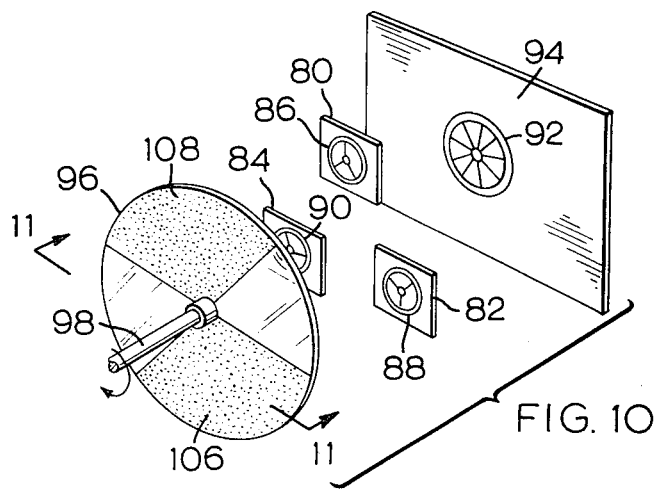
FIG. 10 is a schematic perspective view of a further embodiment of the present invention.

With reference to FIG. 1, a means by which preselected areas on a display means may be illuminated is illustrated. An advertisement shown as visible forms 17 and 18 is set out on display means or sign generally designated by the numeral 16. A pair of projectors 19 and 20 are arranged to illuminate sign 16. Positioned within each projector 19 and 20 is a transparency having optically projectable forms which correspond at least in part with forms 17 and 18 of sign 16. Projectors 19 and 20 are so arranged that the images cast upon sign 16 coincide with forms 17 and 18.

Referring to FIG. 2, a transparency 22 suitable for use in projectors 19 and 20 is illustrated. Transparency 22 is composed of background 23 and optically projectable forms 24 and 25 corresponding to forms 17 and 18 on sign 16. To produce transparency 22 suitable for mounting in projector 19 a photograph is taken of sign 16, preferably in the manner described with reference to FIG. 15. The photograph is taken by means of a camera positioned in the same position as projector 19. Panchromatic type film within the camera is exposed and the film is developed to produce a tone negative of forms 17 and 18. If it is desired to illuminate only forms 17 and 18 on sign 16, the forms on the tone negative corresponding to forms 24 and 25 on finished transparency 22 must be completely black or opaque and the background corresponding to background 21 must be clear or transparent. The forms are darkened by the application of masking or india ink. The background may be made transparent by scraping off the emulsion on the tone negative by means of a knife. In the alternative, a second film may be overexposed to the negative so that the areas on the second negative corresponding to the non-opaque background on the first negative will be over-exposed and dark, and the forms, being opaque on the first negative, clear. If a third film is exposed to the second negative, the resulting negative will have opaque forms and a clear background. Transparency 22 is a negative produced from high contrast film exposed to the negative described above. Transparency 22 will accordingly have an opaque background 23 and transparent optically projectable forms 24 and 25. When transparency 22 is mounted within projector 19, the image cast upon sign 16 will coincide with forms 17 and 18 when projector 19 is properly focused so that only forms 17 and 18 will be illuminated.

As stated, when transparency 22 is mounted in projector 19, the image cast upon sign 16 will coincide with forms 17 and 18. Thus only forms 17 and 18 will be illuminated by projector 19 and background 21 will be dark. Forms 17 and 18 may then be animated according to the method of the invention by varying or interrupting the illumination cast thereon. Various means may be employed to vary the illumination. One such means which is particularly effective is by the use of light polarizing material. FIG. 3 shows a section of a projector suitable for varying or interrupting the illumination by polarizing means. Projector 26 is composed of a case 27 within which is mounted a light source 28, reflector 29 and transparency or slide holder 30. A bellows 31 together with lens 32 is positioned at the front of case 27, lens 32 being provided with a conventional adjustment means 33 in order to focus projector 26, the point of focus being on a transparency 34 removably placed in projector 26. An endless polarizing belt 35 mounted for movement in at least the area indicated at 36 in front of transparency 34 is driven by motor 37. Rollers 38 and 39 guide belt 35 within case 27 so that the belt 35 passes in front of transparency 34 at area 36. Power is supplied through supply lead 40.

With reference to FIG. 4, an enlarged perspective view of belt 35 is shown. Belt 35 is made from a band of transparent material, preferably of plastic, indicated as 41 overlaid with strips of light polarizing material. As shown, belt 35 is made by cutting several strips 42, 43 and 44 from a sheet of polarizing material and fastening the strips onto band 41 so that the orientation of the plane of polarization of each strip 42, 43 and 44 with respect to the longitudinal axis of band 41 varies from strip to stirp. Thus the plane of polarization of belt 35 varies continuously along its entire length. By moving belt 35 at a predetermined rate past the image projected through transparency 34, variable plane polarized light is projected through lens 32 onto sign 16.

With reference to FIG. 5, a transparency suitable for use with projector 16 is illustrated. Transparency 34 may be obtained by overlaying a number of strips 46, 47 and 48 onto transparency 22 shown in FIG. 2. The orientation of the plane of polarization of each strip 46, 47 and 48 is different from that of adjacent strips. Light from source 28 transmitted through transparency 34 will be polarized by strips 46 to 48 which may be considered as a polarizer. Belt 35 may be considered the analyzer and as it moves past the light transmitted through transparency 34, the plane of polarization of belt 35 varies with respect to strips 46 to 48. Thus the illumination produced by projector 26 on sign 16 will constantly vary as belt 35 passes in front of transparency 34 and different portions of the image cast on forms 17 and 18 will be successively light and dark, the net effect being a rippling or animation of the image.

Referring to FIG. 6, a transparency 49 suitable for use in a projector projecting a background image is shown. In this case, optically projectable forms 60 are opaque while the background is transparent. Belt 35 is not necessary in a projector in which transparency 49 is mounted but in other respects the projector will be identical to projector 26 shown in FIG. 3. Such a projector and transparency would produce background illumination on sign 16 and when two images are projected onto sign 16, as shown in FIG. 1, the background will be illuminated and forms 17 and 18 will be animated.

With reference to FIG. 7, a method for mounting the projectors onto a particular sign is illustrated. In this case, the sign 51 is provided with a projector 52 mounted above sign 51. The image projected by projector 52 is directed onto reflecting means in the form of a concave mirror 53 supported on arm 54 in front of sign 51. Mirror 53 effectively illuminates sign 51 and is particularly suitable where there is little or no free space in front of sign 52 to permit mounting of projectors as shown in FIG. 1. In addition, where one projector cannot illuminate the whole of sign 51, a number of projectors may be employed. Projectors may also be mounted behind sign 51 where sign 51 is composed of a panel or panels of translucent material. It will be evident that according to the present invention, any overlapping of the images cast by the projectors will not affect the total result of the system.

When the transparency which is overlaid with polarizing material and the background transparency are placed in the same position from which the respective exposures were taken and light from the light source project therethrough, the images cast upon the sign will coincide precisely with the advertisement and background on the original sign. Thus the transparency is produced by photographic means, special set-ups or measurements are not required. The images projected onto the sign can be easily focused so that they coincide with the corresponding visible forms on the display means. Thus the sign when unilluminated will have the appearance of a normal billboard and, by means of illumination, the sign can be animated to produce a striking effect. Background illumination may, however, be dispensed with where the background is of little impotrance and the advertisement is of prime importance.

With reference to FIG. 8, a further embodiment of the invention is shown wherein the image cast on the sign apparently moves. In this embodiment a pair of light polarizing transparencies 55 and 56 are provided each of which having two optically projectable forms as at 57 and 58 on transparency 55 and 59 and 60 on transparency 56. An analyzer and interrupter in the form of a disc 61 is provided with an opaque sector 62 which acts as an interrupter and a light polarizing sector 63 which acts as an analyzer. Disc 61 is mounted for rotation on spindle 64. Transparencies 55 and 56 are illuminated by separate light sources (not shown) and disc 61 is mounted between the source of light and transparencies 55 and 56 in order to moderate the heating effect of the light source on the transparencies. The images from the system are focused onto sign 65 to illuminate visible forms 66, 67 and 68, form 67 being illuminated by both forms 58 and 59.

As seen from FIG. 8, transparency 55 is positioned above transparency 56, the lower edge of form 58 and the upper edge of form 59 being on opposite sides of diameter 70 so that light will not be transmitted through transparencies 55 and 56 simultaneously. In such a case, the desired sequence of illumination of forms 66–68 will be achieved.

In use, disc 61 is caused to rotate. Initially the plane of polarization of sector 63 is parallel to the plane of polarizaition of form 58 and light passes through sector 63 and form 58 to illuminate visible form 67 on sign 65. At this time the plane of polarization of form 57, which is normal to that of the plane of polarization of sector 63, prevents light from passing therethrough. Also, at this time opaque sector 62 prevents any light from passing through forms 59 and 60 on transparency 56. Rotation of disc 61 causes the image cast on visible form 67 through form 58 to fade and the image from form 59 to become brighter so that visible form 67 remains illuminated. When disc 61 has rotated 180° from that shown, opaque sector 62 will be in front of transparency 66 and no image will be in front of transparency 55 and no image will be cast on sign 65 by transparency 55. At the same time the plane of polarization of sector 63 and form 60 will be parallel whereby form 68 will be illuminated. Still further rotation of disc 61 will bring the plane of polarization of sector 63 in line with that of form 57 at which time visible form 66 will be illuminated by transparency 55. If the cycle is repeated, the visible forms will be illuminated in the following sequence: first 67, then 68, then 67, then 66 and then back to 67 to repeat. Thus the image on sign 65 will have an apparent up and down motion. It will be evident that more than two transparencies may be used for this purpose. As an alternative to the division of disc 61 into sectors, it is contemplated that disc 61 may be constructed entirely of polarizing material.

FIG. 9 illustrates diagrammatically a preferred embodiment of a method of animating a display means wherein a transparency 70 similar to transparency 34 shown in FIG. 5, is used in conjunction with an optical projection system and a light polarizing disc 71. The optical projection system comprises a reflector 72, a light source 73, a condensing system indicated generally by 74 and a projection lens 75. Condensing system 74 comprises meniscus lens 76, infrared heat filter 77 and convex lens 78. The polarizing material secured to disc 71 or of which disc 71 is constructed may be plain polarized or patterned. It will be evident that light from source 73 will be directed through disc 71 and transparency 70 onto a display means from light source 73 by means of reflector 72, condensing system 74 and projection lens 75. The plane of polarization of the light will be continuously varied by disc 71 and the light will be directed onto preselected areas of the display means by transparency 70. The strength of illumination will vary constantly according to the orientation of the plane of polarization of disc 71 with respect to the polarizing material overlaid on transparency 70.

Other means may be employed for varying the illumination projected onto preselected areas of the display means as an alternative to the use of polarizing material. With reference to FIG. 10, three transparencies 80, 82 and 84 are provided, each of which having an opaque background and transparent forms shown as wagon wheels 86, 88 and 90 corresponding with wagon wheel 92 on sign 94 except that only one in three of the spokes shown on wheel 92 are shown on each wheel 86, 88 and 90. A disc-shaped interrupter 96 is mounted for rotation on spindle 98.

Figure 11:
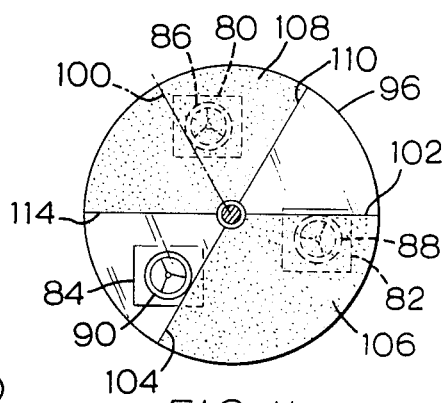
FIG. 11 is a view on line 11—11 of FIG. 10.

With reference to FIG. 11, three radii of disc 96 are shown numbered 100, 102, and 104. The angle between adjacent radii is 120° and transparencies 80, 82 and 84 are so mounted that radii 100, 102 and 104 are disposed tangentially to wheels 86, 88 and 90 respectively. Disc 96 is composed of a pair of opaque sectors 106 and 108, the angle between facing edges or radii 110 and 102 and between facing edges or radii 104 and 114 being 60°. It will be seen that if a light source is directed onto each transparency 80, 82, and 84 and disc 96 is positioned between the light source and transparencies 80, 82 and 84, the only transparency through which light will be transmitted will be transparency 84. As disc 96 rotates in the direction indicated by the arrow in FIG. 10, sector 106 will commence to block out transparency 84 and transparency 82 will begin to be uncovered. Thus as disc 96 rotates, light will be transmitted through wheel 90, then wheel 88, then wheel 86 and back to wheel 90. As successive spokes on wheel 92 will be illuminated, the illustion of rotation of wheel 92 will be achieved provided that transparencies 80, 82 and 82 are so arranged that successive spokes on wheel 92 are illuminated as disc 96 revolves. It has been found that the more transparencies that are use, the smoother will appear the rotating movement of wheel 92; it has not been found possible to achieve the illusion of rotation using only two transparencies.

Figure 12:
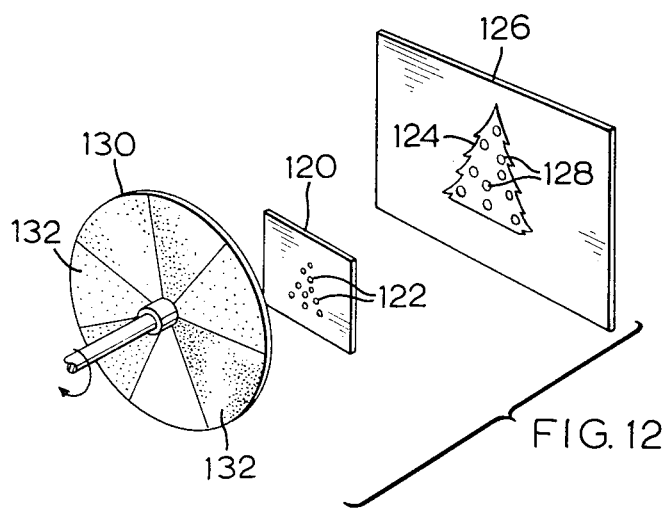
FIG. 12 and 13 are schematic perspective views of further embodiments of the invention.

A further means for varying the illumination is illustrated in FIG. 12. A transparency 120 is opaque except for transparent forms shown as lights 122. Each light 122 is overlaid with light transmitting material of a different colour. Christmas tree 124, shown on sign 126, has lights 128 corresponding to lights 122. Preferably tree 124 will be illuminated by a second non-animating transparency (not shown). Disc 130 is provided with sectors 132 each of a different colour. Rotation of disc 130 will act as a filter to light, and light transmitted through transparency 120 onto sign 126 will vary both in intensity and in colour. Thus the lights on tree 124 will appear to both pulse and change in colour.

Figure 13:
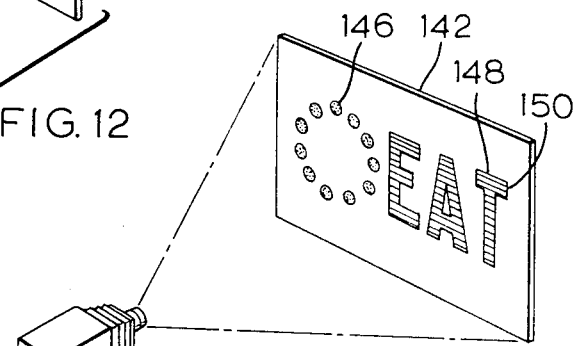

A further method of achieving animation according to the invention is illustrated in FIG. 13. According to the method, a photograph is taken of a display means from a fixed point. A number of negatives are obtained from the photograph and successive portions of the forms on each negative corresponding to the forms on the display means to be animated are selectively darkened according to the same method as was described in relation to FIG. 2 and a transparency obtained from each negative. The display means is illuminated by means of an optical projection system and animation is achieved by projecting for a predetermined interval each transparency in turn onto the display means. As shown, animation is achieved by use of a motion picture projector 140 illuminating sign 142 imprinted with visible forms shown partly as a plurality of balls 146 arranged in the form of a circle. To provide suitable transparencies, a camera is positioned approximately in the same position as projector 140 and the film in the camera is exposed. A number of identical negatives is obtained and on each negative a different ball 146 is darkened and the remaining balls on each negative made transparent. A transparency is produced from each negative and if the transparencies are formed into a continuous strip in which a transparency of one transparent ball follows the transparency of an adjacent transparent ball, it will be evident that when the film is projected onto sign 142 it will appear as if a ball is travelling in a circle. While less suitable, a slide projector may be substituted for projector 140 in which case, of course, transparencies will be displayed in succession.

As an alternative method to the above and by way of further example, letters 148 on sign 142 are shown to be broken by a plurality of parallel lines 150. To produce the illusion that the lines are moving a series of photographs is taken of sign 142, each photograph showing lines 150 in a position slightly below the position at which lines 150 were situated in the previous photograph. The position of lines 150 may be altered very simply by drawing parallel lines on a sheet of cellophane or transparent plastic and altering the position of the sheet with respect to letters 148 for each successive photograph. As before, if the photographs are formed into a roll of transparencies or a film strip so that successive transparencies are adjacent each other, the images projected onto sign 142 will give the impression that lines 150 are moving upwardly or downwardly on letters 148.

Figure 14:
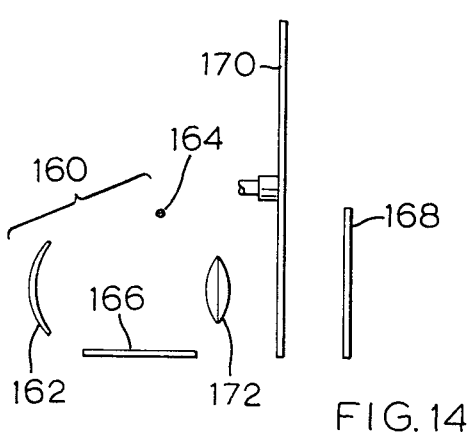
FIG. 14 is a diagrammatic representation of an epidiascope adapted to illuminate and animate display means in accordance with the invention.

A transparency need not be employed to produce an image on a sign. FIG. 14 illustrates diagrammatically an epidiascope indicated generally as 160 comprising a reflector 162 and light source 164 which projects an image from material 166 onto sign 168. Interrupter 170 is shown positioned between reflector 162 and sign 168. It will be evident that an image may be obtained from an opaque print inasmuch as no light need be transmitted through the print.

It will also be evident that the display means may include any smooth surface and may even include three-dimensional objects. It is also contemplated that the forms on the display means may, as well as being painted or secured thereon, be an image projected from a separate projector.

Figure 15:
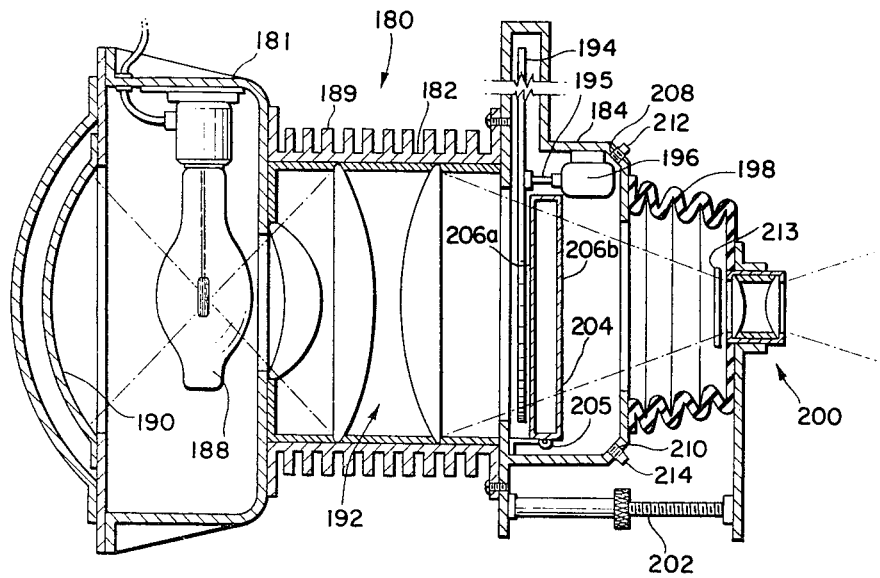
FIG. 15 is a mid-vertical section through an apparatus suitable for obtaining a photograph and projecting a transparency.

The transparency is obtained from film exposed in the apparatus illustrated in FIG. 15. The apparatus includes a housing generally 180 comprising a lamp casing 181, condensing lens casing 182 and a front casing 184.

Power is supplied through a conventional supply lead to light-bulb 188 and a reflector 190 and a conventional condensing lens system 192 are mounted on opposite sides of bulb 188. Condensing lens casing 182 is round and has a plurality of fins 189 formed about the outside wall for purposes of cooling.

Front casing 184 is removably attached to casing 182. Within the casing is mounted an analyzing or interrupting disc 194 mounted at its centre to a shaft 195 rotated by motor 196. Preferably the disc is formed of heat absorbing material in order to prevent the transparency within the apparatus from being damaged by heat. Alternatively, an infrared filter may be positioned on either side of lens system 192. A bellows 198 together with a projection or camera lens system 200 is positioned at the front of casing 184, lens 200 being provided with a conventional adjustment means 202 in order to focus the apparatus, the point of focus being on a transparency removably placed in guide 204.

Guide 204 is fixed to condensing lens casing 182 and remains so fixed when front casing 184 is removed therefrom. A tilting mechanism 205 allows the orientation of the vertical axis of the guide to be adjusted. Guide 204 is composed of two rectangular shaped members 206a and b both having rectangular openings formed therein for the passage of light from light source 188 to lens system 200. Apertures 208 and 210 permit viewing of material contained within the guide and threaded plugs 212 and 214 when within the aperture, prevent lights from passing through the aperture.

A shutter 213 is also mounted in casing 184 between guide 204 and lens system 200. Conventional means is provided for varying the speed of the shutter. In addition, the shutter may be locked in an open position when the apparatus is used to project the image from a transparency mounted within guide 204 onto the display means.

The transparency is produced as follows: Front casing 184 is separated from condensing lens casing 182. Translucent paper is placed in film guide 204 and light bulb 188 is turned on. An elliptical area on the paper will be illuminated by light which emerges from condensing lens system 192. This is the only area which will be illuminated by the bulb; no image will be cast on the display means or billboard from any portion of the transparency outside this area. Preferably an opaque card having an opening in registry with the elliptical area is permanently affixed to guide 204. The front casing 184 is reattached to condensing housing 182.

The image of the billboard which is focused by lens system 200 on the translucent paper is then viewed through aperture 208 or 210. The location of the projector i.e. established where the image on the portion of the paper which is within the opening in the opaque card is of the areas on the billboard which it is desired to illuminate. Fine adjustment of the illuminated areas is accomplished by means of tilting mechanism 205. Projection lens system 200 is adjusted using adjustment means 202 to bring the image on the translucent paper into proper focus.

Figure 16:
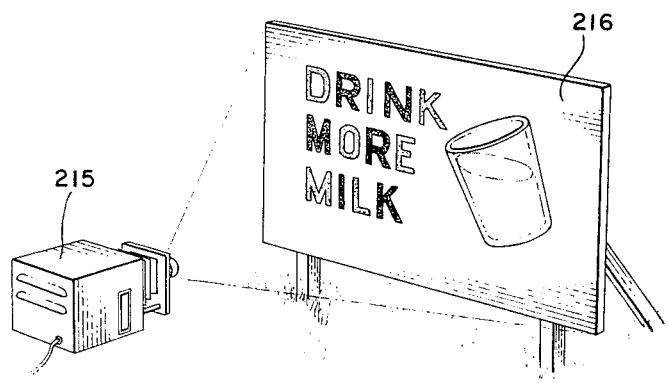
FIG. 16 illustrates the manner in which a display means is photographed.

Photographic film such as panchromatic film or Polaroid type 55 P/N4 x 5 film is substituted for the translucent paper in guide 204. With reference to FIG. 16, the apparatus illustrated in FIG. 15 is established at fixed station 215 in spaced relation with billboard 216 and shutter 212 is open for a pre-selected interval of time in order to expose the film to the billboard. A transparency is produced from the photograph of the billboard in the manner described with reference to FIG. 2.

The transparency is then inserted into guide 204 while the apparatus remains at the station from which the photograph was obtained and light bulb 188 is turned on to illuminate the billboard. It is not of course necessary to use the apparatus of FIG. 15 but where the device used to project an image from the transparency onto the billboard is not the same as the camera used to obtain the photograph, certain steps must be taken to ensure registry of the image with visible forms 218 on the billboard. The transparency must be in the same position as the film was from which the transparency was obtained. In addition, the projection lens system 200 must be identical with, preferably the same as, the lens system of the camera used to obtain the photograph.

The aperture setting of lens system 200 used to obtain the photograph and to project the image from the transparency must also be the same. In other words the diameter of the circular passage of light which passes through the lens system to expose a film must be the same as the diameter of the passage of light which passes through the lens system and forms the image on the billboard. Preferably, the aperture setting of projection lens system 200 should be at a maximum in order to adequately illuminate the billboard, therefore the aperture setting of the camera lens should also be set at a maximum. A filter may be necessary to ensure that the film is not overexposed when the lens is set at maximum aperture. Such filter may take the form of translucent material or two layers of light polarizing material. Where such light polarizing material is used, provision must be made for selective rotation of one layer with respect to the other so that the plane of polarization of one layer can be varied with respect to the other. By proper choice of exposure time and orientation of the light polarizing layers, a satisfactory negative can be obtained.

Where the above described method is employed, the image will coincide more or less precisely with the pre-existing foams on the display means. The results will not be as satisfactory however, where a different lens is employed or the locations of the camera and projector are not the same. Either the image will be completely out of registry with the forms on the display means or there will only be registry over a limited portion of the display means.

Figure 17:
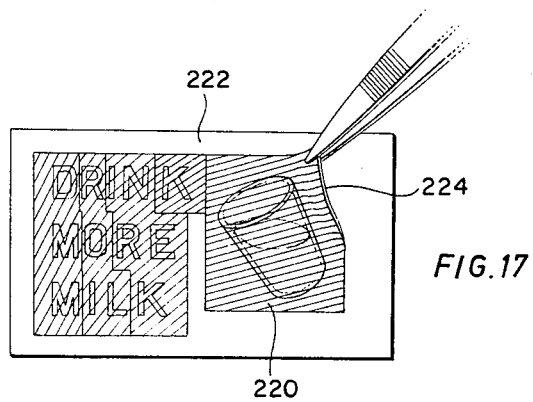
FIG. 17 illustrates the manner in which polarizing material is applied to a transparency.

FIG. 17 illustrates the manner in which light-polarizing material 220 is applied to transparency 222. A layer of pressure sensitive adhesive 224 is applied to the material 220 and the material is then contacted with the transparency in order to bond the material to the transparency.

I claim:

1. A method of illuminating pre-selected areas on a display means having visible forms thereon including: locating at a fixed station photographic film within a camera; exposing said film to light passing through a circular passage of a first lens system to obtain a negative of said display means; obtaining from said negative a transparency which is opaque save for clear optically projectable forms corresponding to said pre-selected areas on said display means; locating said transparency at said fixed station; directing light from a light source through said transparency and a circular passage of a lens system identical to said first lens system onto said display means to produce an image on said display means in registry with said pre-selected areas, the diameter of the circular passage of said first lens system when said film is exposed to light being the same as the diameter of the circular passage of said identical lens system when used to produce said image.

2. The method as claimed in claim 1 including the step of adjusting the circular passage of said first lens system to as large a diameter as possible when said film is exposed to light through said lens system and adjusting the circular passage of said identical lens system to as large a diameter as possible when light is directed through said transparency and said identical lens system onto said display means.

References Cited
UNITED STATES PATENTS
3,090,280  5/1963  Winter, Jr. _____ 353—28

DONALD O. WOODIEL, Primary Examiner